(12) United States Patent
Urabayashi et al.

(10) Patent No.: US 10,785,760 B2
(45) Date of Patent: Sep. 22, 2020

(54) BASE STATION AND RADIO TERMINAL (71) Applicant: KYOCERA CORPORATION, Kyoto (JP)

(72) Inventors: Hiroyuki Urabayashi, Yokohama (JP); Chiharu Yamazaki, Tokyo (JP); Kugo Morita, Yokohama (JP); Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 16/145,599

(22) Filed: Sep. 28, 2018

(65) Prior Publication Data

US 2019/0045492 A1   Feb. 7, 2019

Related U.S. Application Data

(63) Continuation of application No. PCT/JP2017/011808, filed on Mar. 23, 2017.

(30) Foreign Application Priority Data

Mar. 30, 2016   (JP) .................................. 2016-067659

(51) Int. Cl.
*H04W 72/04*   (2009.01)
*H04L 5/00*   (2006.01)
(Continued)

(52) U.S. Cl.
CPC ......... *H04W 72/042* (2013.01); *H04L 5/0053* (2013.01); *H04L 5/0058* (2013.01); *H04W 72/0446* (2013.01); *H04W 74/0833* (2013.01); *H04L 5/0007* (2013.01); *H04W 72/1289* (2013.01)

(58) Field of Classification Search
CPC ..... H04W 72/04; H04W 72/12; H04W 74/08; H04W 72/042; H04W 74/0833; H04W 72/0446; H04W 72/1289
See application file for complete search history.

(56) References Cited

U.S. PATENT DOCUMENTS

2015/0195817 A1   7/2015   Sathananthan
2017/0163388 A1*  6/2017   Wiemann ............... H04L 1/1851
(Continued)

OTHER PUBLICATIONS

Huawei, HiSilicon; "Short TTI for DL transmissions"; 3GPP TSG RAN WG1 Meeting #84; R1-160292; Feb. 15-19, 2016; St. Julian's, Malta.
NTT Docomo, Inc.; "DL aspects of TTI shortening"; 3GPP TSG RAN WG1 Meeting #84; R1-160964; Feb. 15-19, 2016; pp. 1-7; St. Julian's, Malta.
ZTE; "Downlink control channels for short TTI"; 3GPP TSG RAN WG1 Meeting #84; R1-160983; Feb. 15-19, 2016; pp. 1-5; St. Julian's, Malta.

(Continued)

*Primary Examiner* — Chi Ho A Lee
*Assistant Examiner* — Andrew Lee
(74) *Attorney, Agent, or Firm* — Studebaker & Brackett PC (57) ABSTRACT

A base station according to one embodiment comprises a controller configured to perform a downlink transmission process using a subframe. The subframe comprises a main PDCCH (Physical Downlink Control Channel) region located at a head portion of the subframe, and a data region other than the main PDCCH region. The data region comprises a short TTI region to which a short TTI (Transmission Time Interval) having a shorter time length than the subframe is applied. The short TTI region comprises a sub-PDCCH region. The controller is configured to arrange information indicating the sub-PDCCH region in the main PDCCH region.

5 Claims, 8 Drawing Sheets

(51) Int. Cl.
*H04W 74/08* (2009.01)
*H04W 72/12* (2009.01)

(56) References Cited

U.S. PATENT DOCUMENTS

| | | | |
|---|---|---|---|
| 2017/0164213 A1* | 6/2017 | Lim | H04L 5/005 |
| 2018/0212732 A1* | 7/2018 | You | H04L 5/0051 |
| 2018/0213532 A1* | 7/2018 | Hosseini | H04L 5/0044 |
| 2018/0375636 A1* | 12/2018 | You | H04L 5/0044 |
| 2018/0376495 A1* | 12/2018 | Lee | H04W 72/04 |
| 2019/0045487 A1* | 2/2019 | You | H04L 5/0053 |
| 2019/0069312 A1* | 2/2019 | Oh | H04W 72/04 |
| 2019/0222379 A1* | 7/2019 | Kim | H04L 5/0048 |

OTHER PUBLICATIONS

Samsung; "Specification impact for DL due to TTI shortening"; 3GPP TSG RAN WG1 Meeting #84; R1-160585; Feb. 15-19, 2016; pp. 1-4; St. Julian's, Malta.

ZTE; "L1 considerations on latency reduction"; 3GPP TSG RAN WG1 Meeting #83; R1-157151; Nov. 15-22, 2015; pp. 1-6; Anaheim, USA.

CATT; "System Analysis on TTI Shortening"; 3GPP TSG RAN WG1 #83; R1-156613; Nov. 15-22, 2015; pp. 1-8; Anaheim, USA.

Huawei, HiSilicon; "Control signaling enhancements for short TTI"; 3GPP TSG RAN WG1 Meeting #83; R1-156461; Nov. 15-22, 2015; Anaheim, USA.

Huawei, HiSilicon; "Views on TTI length"; 3GPP TSG RAN WG1 Meeting #83; R1-156459; Nov. 15-22, 2015; Anaheim, USA.

* cited by examiner

BASE STATION AND RADIO TERMINAL

CROSS-REFERENCE TO RELATED APPLICATION

The present application is a continuation based on PCT Application No. PCT/JP2017/011808 filed on Mar. 23, 2017, which claims the benefit of Japanese Patent Application No. 2016-067659 (filed on Mar. 30, 2016). The content of which are incorporated by reference herein in their entirety.

FIELD

The present invention relates to a base station and a radio terminal used in a mobile communication system.

BACKGROUND

In recent years, research on technologies for the fifth generation (5G) mobile communication system is underway. As one of such technologies, a technology for shortening a downlink transmission time interval (TTI: Transmission Time Interval) to reduce latency, has been studied (for example, see Non Patent Documents 1 to 3).

In the current specifications of the 3GPP (3rd Generation Partnership Project) and LTE (Long Term Evolution), the TTI is a time length of one subframe, that is, 1 ms. On the other hand, in the TTI shortening technology described above, it is assumed that a short TTI of less than 1 ms is applied.

SUMMARY

A base station according to one embodiment comprises a controller configured to perform a downlink transmission process using a subframe. The subframe comprises a main PDCCH (Physical Downlink Control Channel) region located at a head portion of the subframe, and a data region other than the main PDCCH region. The data region comprises a short TTI region to which a short TTI (Transmission Time Interval) having a shorter time length than the subframe is applied. The short TTI region comprises a sub-PDCCH region. The controller is configured to arrange information indicating the sub-PDCCH region in the main PDCCH region.

A base station according to one embodiment comprises a controller configured to perform a downlink transmission process using a subframe. The subframe comprises a PDCCH (Physical Downlink Control Channel) region in which control information is arranged. The controller is further configured to arrange downlink data in the PDCCH region. The PDCCH region comprises a main PDCCH region located at a head portion of the subframe. The subframe further comprises a data region other than the main PDCCH region. The data region comprises a short TTI region to which a short TTI (Transmission Time Interval) having a shorter time length than the subframe is applied. The PDCCH region further comprises a sub-PDCCH region arranged in the short TTI region. The controller is further configured to arrange the downlink data in at least one of the main PDCCH region and the sub-PDCCH region.

A base station according to one embodiment comprises a controller configured to perform a downlink transmission process using a subframe. The subframe comprises a main PDCCH (Physical Downlink Control Channel) region located at a head portion of the subframe, and a data region other than the main PDCCH region. The data region comprises a short TTI region to which a short TTI (Transmission Time Interval) having a shorter time length than the subframe is applied. The short TTI region comprises a plurality of sub-PDSCH (Physical Downlink Shared Channel) regions. The controller is configured to perform scheduling of the plurality of sub-PDSCH regions collectively in one PDCCH transmission.

A radio terminal according to one embodiment comprises a controller configured to perform a downlink reception process using a subframe. The subframe comprises a main PDCCH (Physical Downlink Control Channel) region located at a head portion of the subframe, and a data region other than the main PDCCH region. The data region comprises a short TTI region to which a short TTI (Transmission Time Interval) having a shorter time length than the subframe is applied. The short TTI region comprises a sub-PDCCH region. The controller is configured to, when information indicating the sub-PDCCH region is arranged in the main PDCCH region, identify the sub-PDCCH region based on the information.

A radio terminal according to one embodiment comprises controller configured to perform a downlink reception process using a subframe. The subframe comprises a main PDCCH (Physical Downlink Control Channel) region located at a head portion of the subframe, and a data region other than the main PDCCH region. The data region comprises a short TTI region to which a short TTI (Transmission Time Interval) having a shorter time length than the subframe is applied. The short TTI region comprises a plurality of sub-PDSCH (Physical Downlink Shared Channel) regions and at least one sub-PDCCH region. The plurality of sub-PDSCH regions are scheduled collectively in one PDCCH transmission. The controller is configured to identify the scheduling based on allocation information arranged in the main PDCCH region or the sub-PDCCH region.

A radio terminal according to one embodiment comprises a controller configured to perform a downlink reception process using a subframe. The subframe comprises a PDCCH (Physical Downlink Control Channel) region in which control information is arranged. The control information comprises, if downlink data is further arranged in the PDCCH region, allocation information indicating a PDCCH resource to be allocated in which the downlink data is arranged. The controller is configured to identify the PDCCH resource to be allocated based on the allocation information.

DESCRIPTION OF THE EMBODIMENT

Configuration of Mobile Communication System

Figure 1:
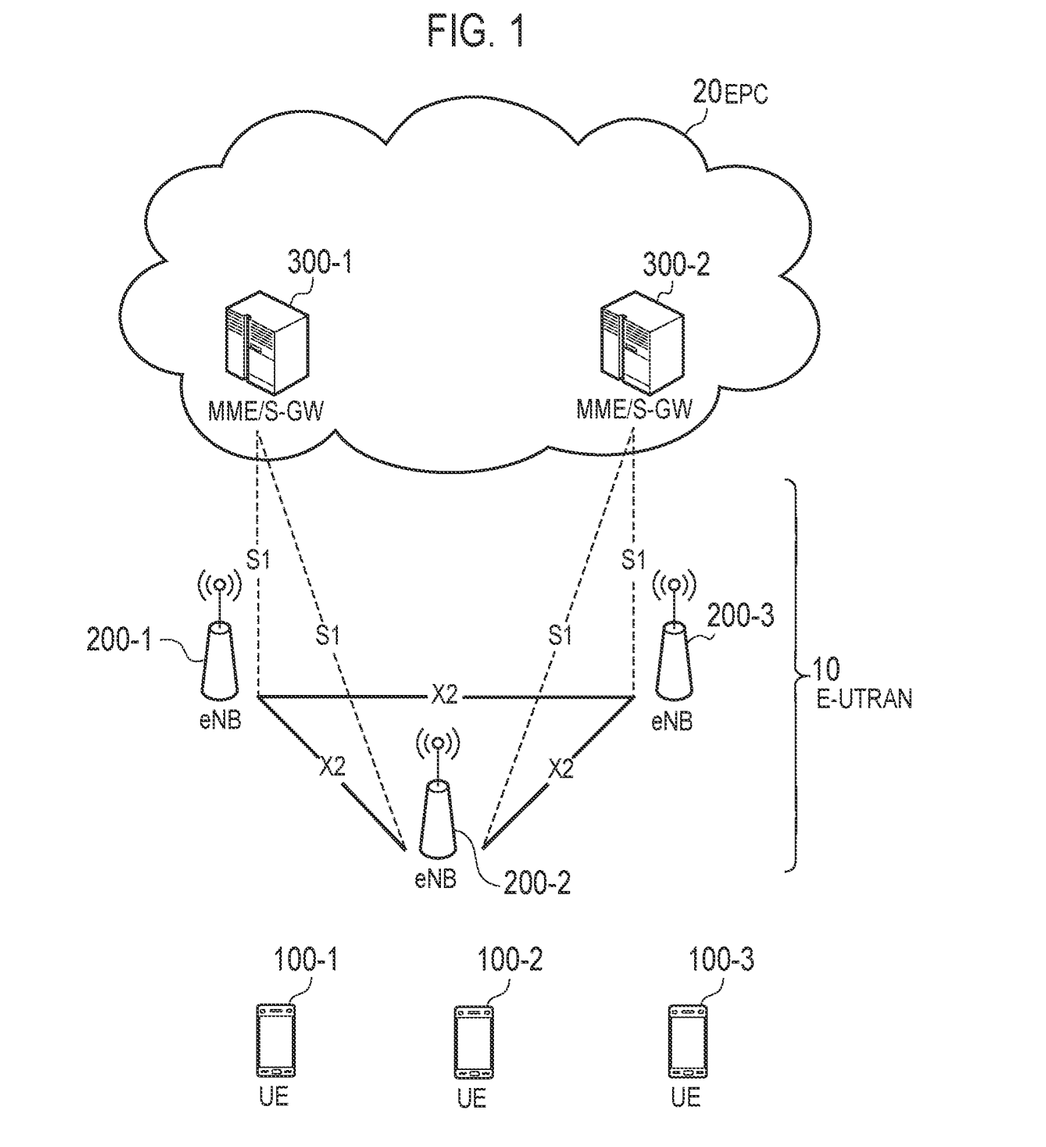
FIG. 1 is a diagram illustrating a configuration of a mobile communication system according to an embodiment.

Hereinafter, the configuration of the mobile communication system according to the embodiment will be described. FIG. 1 is a diagram showing a configuration of a mobile communication system according to the embodiment. The mobile communication system according to the embodiment is a mobile communication system based on 3GPP-LTE.

As illustrated in FIG. 1, the mobile communication system according to the embodiment includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network of the LTE system.

A UE 100 corresponds to a radio terminal. The UE 100 is a mobile terminal and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. The configuration of the UE 100 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Figure 2:
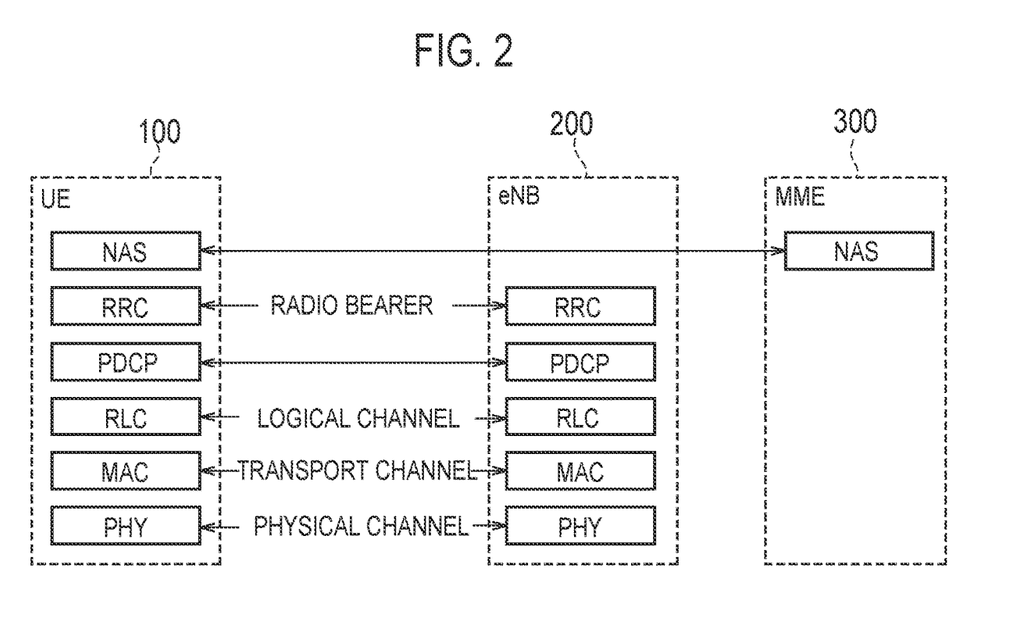
FIG. 2 is a diagram illustrating a protocol stack of a radio interface in a mobile communication system according to the embodiment.

FIG. 2 is a diagram illustrating protocol stack of a radio interface in the mobile communication system according to the embodiment. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control signaling. Between the RRC layer of the UE 100 and the RRC layer of the eNB 200, signaling (RRC signaling) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 3:
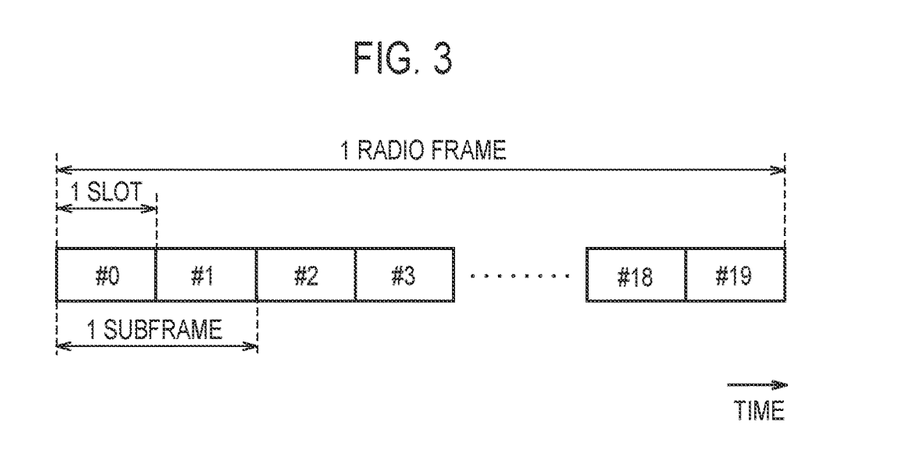
FIG. 3 is a diagram illustrating a configuration of a radio frame used in the mobile communication system according to the embodiment.

FIG. 3 is a configuration diagram of a radio frame used in the mobile communication system according to the embodiment.

As illustrated in FIG. 3, a radio frame is configured by 10 subframes arranged in a time direction. Each subframe is configured by two slots arranged in the time direction. Each subframe has a time length of 1 ms and each slot has a time length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the time and frequency resources assigned to the UE 100, a frequency resource can be identified by a resource block and a time resource can be identified by a subframe (or a slot).

Figure 4:
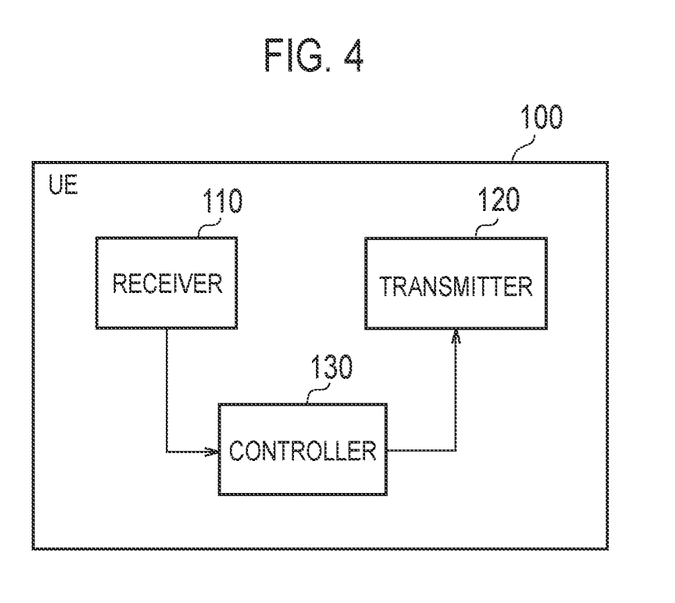
FIG. 4 is a diagram illustrating a configuration of a UE (radio terminal) according to the embodiment.

FIG. 4 is a diagram of the configuration of the UE 100 (radio terminal) according to the embodiment. As illustrated in FIG. 4, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor further include a codec that performs encoding and decoding on sound and video data. The processor executes the above-described various processes and various processes to be described later.

Figure 5:
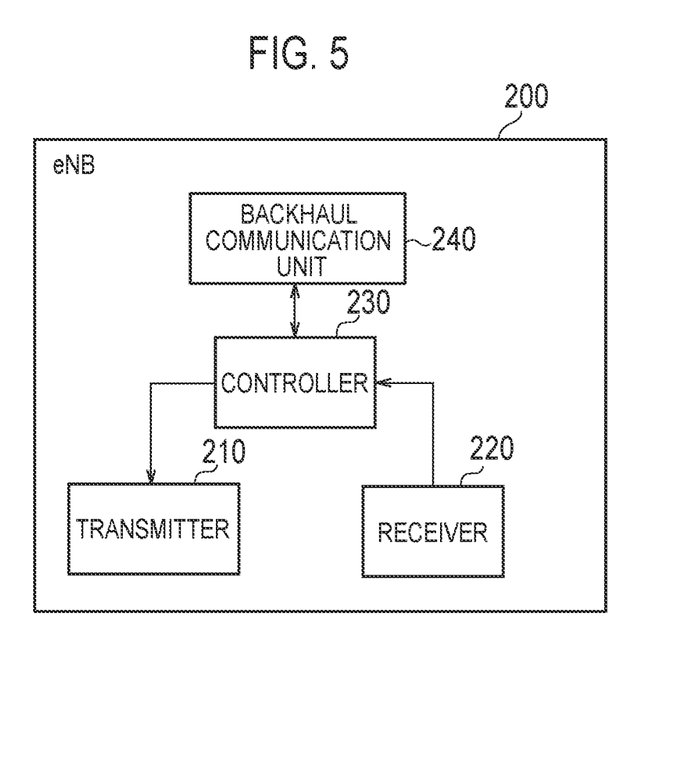
FIG. 5 is a diagram illustrating a configuration of an eNB (base station) according to the embodiment.

FIG. 5 is a diagram illustrating configuration of the eNB 200 (base station). As illustrated in FIG. 5, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes the above-described various processes and various processes to be described later.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

TTI Shortening Technology

A TTI shortening technology according to the embodiment will be described below.

Figure 6:
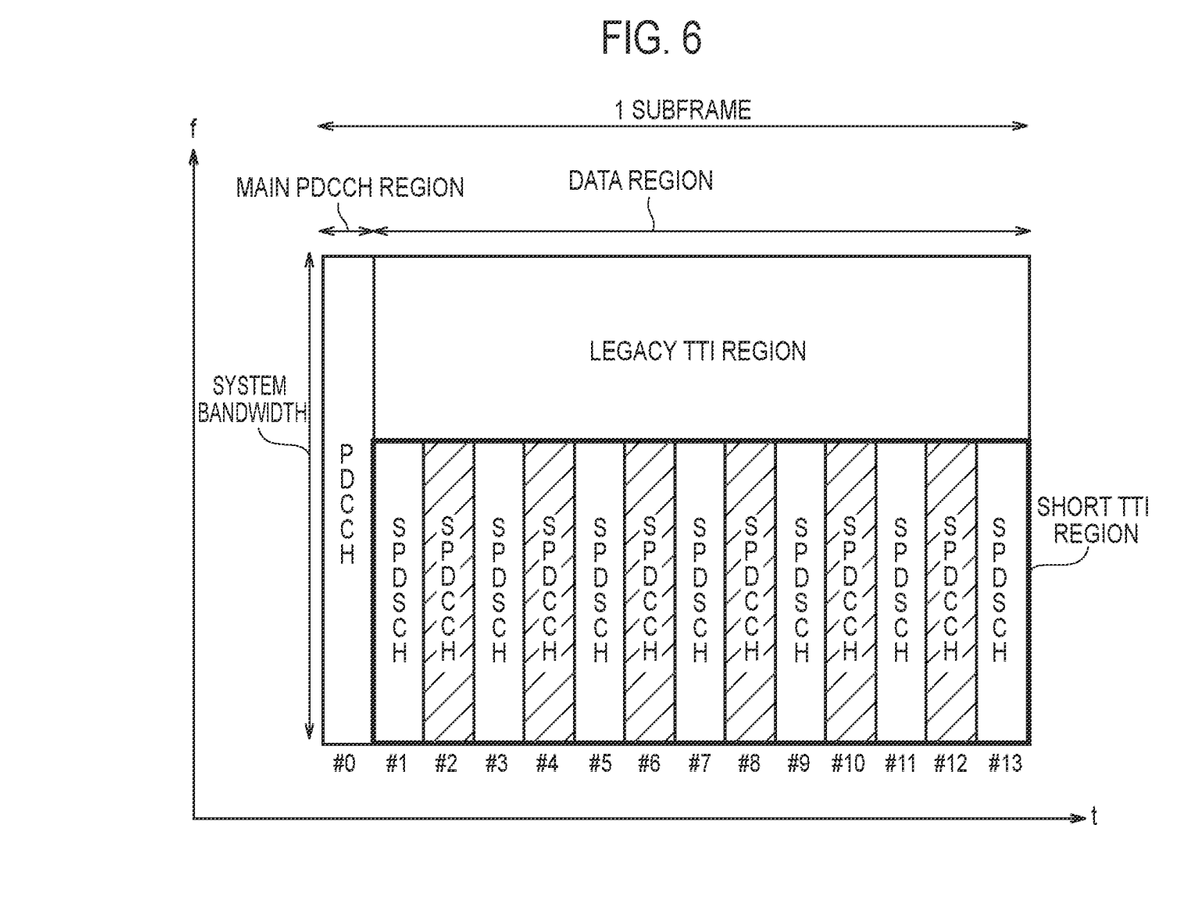
FIG. 6 is a diagram illustrating an example of a TTI shortening technology according to the embodiment.

FIG. 6 is a diagram illustrating an example of the TTI shortening technology according to the embodiment. In FIG. 6, a horizontal direction indicates a time (t) and a vertical direction indicates a frequency (f). Further, FIG. 6 illustrates an example in which one subframe includes 14 OFDM symbols (OFDM symbols #0 to #13) in the time (t) direction. However, the number of OFDM symbols included in one subframe is not limited to 14. It is noted that one subframe includes a plurality of resource blocks (RBs) in the frequency (f) direction.

As illustrated in FIG. 6, a subframe of the downlink includes a main PDCCH (legacy PDCCH) region and a data region.

The main PDCCH region is located at a head portion of the subframe. In the example of FIG. 6, the main PDCCH region is located in a head symbol (#0) of the subframe in the time direction. However, the number of OFDM symbols constituting the main PDCCH region is not limited to one, but may be two, three, or the like. The main PDCCH region is arranged over the entire system bandwidth in the frequency direction.

Control information such as allocation information of the data region is arranged in the main PDCCH region. The control information is information for controlling data transmission and reception. The allocation information includes a resource block to be allocated, MCS and the like of downlink data (PDSCH). It is noted that PDCCH allocation in the main PDCCH region is performed in a resource unit referred to as CCE (Control Channel Element).

The data region is a region other than the main PDCCH region. The data region is arranged from OFDM symbols #1 to #13 in the time direction. The data region includes a legacy TTI region and a short TTI region. In the example of FIG. 6, the legacy TTI region and the short TTI region are multiplexed by frequency division multiplexing (FDM).

A TTI having a time length of a subframe (that is, 1 ms) is applied to the legacy TTI region. On the other hand, a short TTI having a time length shorter than the subframe is applied to the short TTI region. In the example of FIG. 6, the short TTI has a time length of two OFDM symbols. However, the TTI applied to the short TTI region is not limited to two OFDM symbols, but may be a time length such as three or four OFDM symbols. It is noted that a UE not supporting the short TTI (that is, a legacy UE) is allocated with downlink data (PDSCH) in the legacy TTI region. Thus, backward compatibility is ensured.

The short TTI region includes a plurality of sub-PDCCH (SPDCCH) regions and a plurality of sub-PDSCH (SPDSCH) regions. The sub-PDCCH region may be referred to as a short PDCCH region. The sub-PDSCH region may be referred to as a short PDSCH region. The SPDCCH region and the SPDSCH region are multiplexed by time division multiplexing (TDM). Each SPDCCH region and each SPDSCH region has a time length of one OFDM symbol. In the example of the short TTI region in FIG. 6, each of OFDM symbols #2, #4, #6, #8, #10, and #12 is an SPDCCH region and each of OFDM symbols #1, #3, #5, #7, #9, #11, and #13 is an SPDSCH region. For example, an SPDSCH region of an OFDM symbol #n is assigned by using an SPDCCH region of an OFDM symbol #(n-1).

Here, an example of an allocation using the short TTI region is described. The eNB 200 allocates downlink data (PDSCH) of a UE 100#1 to the SPDSCH region of the OFDM symbol #1 and arranges allocation information indicating an allocated PDSCH resource in the main PDCCH region. The allocation information may include, in addition to the normal allocation information, information indicating an allocated OFDM symbol #1. The UE 100#1 performs decoding of the main PDCCH region and acquires allocation information of the UE 100#1. Based on the allocation information, the UE 100#1 decodes downlink data arranged in the SPDSCH region of the OFDM symbol #1. Further, the eNB 200 allocates downlink data (PDSCH) to a UE 100#2 in the SPDSCH region of the OFDM symbol #3 and arranges allocation information indicating an allocated PDSCH resource in the SPDCCH region of the OFDM symbol #2. The allocation information may include, in addition to the normal allocation information, information indicating an allocated OFDM symbol #3. The UE 100#2 performs decoding of the SPDCCH region of the OFDM symbol #2 and acquires allocation information of the UE 100#2. Based on the allocation information, the UE 100#2 decodes downlink data arranged in the SPDSCH region of the OFDM symbol #3. Allocation of the remaining symbol interval is performed in a similar manner.

In this way, transmission of allocation information (DCI) and transmission of downlink data in the short TTI region can be performed within a time of two OFDM symbols, and thus, latency can be significantly reduced compared to the legacy TTI region. However, the short TTI region includes the plurality of SPDCCH regions, and thus, the number of PDSCH regions is lower than that in the legacy TTI region. In other words, the number of radio resources (resource elements) usable for transmission of downlink data is small in the short TTI region, and thus, the utilization efficiency of radio resources decreases. Further, the UE 100 not only monitors the main PDCCH region, but also needs to monitor the SPDCCH region and thus, the load and power consumption of the UE 100 increase. The following first to third embodiments solve at least one of these problems.

First Embodiment

A first embodiment will be described below. In each of the following embodiments, a mobile communication system in which the TTI shortening technology is introduced, is assumed.

(1) Base Station According to First Embodiment

The eNB 200 (base station) according to the first embodiment includes the controller 230 configured to perform a downlink transmission process using a subframe. The subframe includes a PDCCH region in which control information is arranged. In the first embodiment, the controller 230 further arranges downlink data (PDSCH) in the PDCCH region. Specifically, the controller 230 arranges the downlink data in at least one of the main PDCCH region and the SPDCCH region. It should be noted that, in existing LTE systems, the control information is arranged in the PDCCH region, whereas the downlink data is not arranged in the PDCCH region. The controller 230 arranges the downlink data in an available region in which the control information is not arranged, in the PDCCH region. Specifically, the available region may be a region in which the search space is set, but the control information is not arranged. The PDCCH resource to be allocated in which the downlink data is arranged, is constituted in CCE units. In other words, PDSCH to be included into a PDCCH region is constituted in CCE units. Therefore, it is possible to increase radio resources (that is, PDSCH resources) usable for transmission of the downlink data by utilizing the PDCCH region, even if the short TTI region is arranged. Specifically, it is possible to utilize, for data transmission, a CCE not utilized for transmission of existing PDCCH (existing DCI), and coexist with the existing PDCCH.

The controller 230 includes, into the control information, allocation information indicating a PDCCH resource to be allocated in which the downlink data is arranged. For example, the controller 230 notifies the arrangement of the PDSCH to be included into the PDCCH region (that is, the CCE), based on a new DCI format. Specifically, the controller 230 designates a CCE index group constituting one data packet, in the allocation information. The CCE index group may be an index group designating a single CCE or continuous CCEs, and may be an index group directly designating a plurality of CCE indexes. Alternatively, if a combination pattern of the plurality of CCE indexes is set in advance, the CCE index group may designate any combination pattern.

(2) Radio Terminal According to First Embodiment

The UE 100 (radio terminal) according to the first embodiment includes a controller 130 configured to perform a downlink reception process by using a subframe. The subframe includes a PDCCH region in which control information is arranged. If downlink data is further arranged in the PDCCH region, the control information includes the allocation information indicating a PDCCH resource to be allocated in which the downlink data is arranged. As described above, the arrangement of the PDSCH to be included into the PDCCH region (that is, the CCE), is notified based on the new DCI format. The controller 130 identifies a PDCCH resource to be allocated based on the allocation information, and receives and decodes downlink data arranged in the identified PDCCH resource to be allocated.

(3) Example of Operation According to First Embodiment

Figure 7:
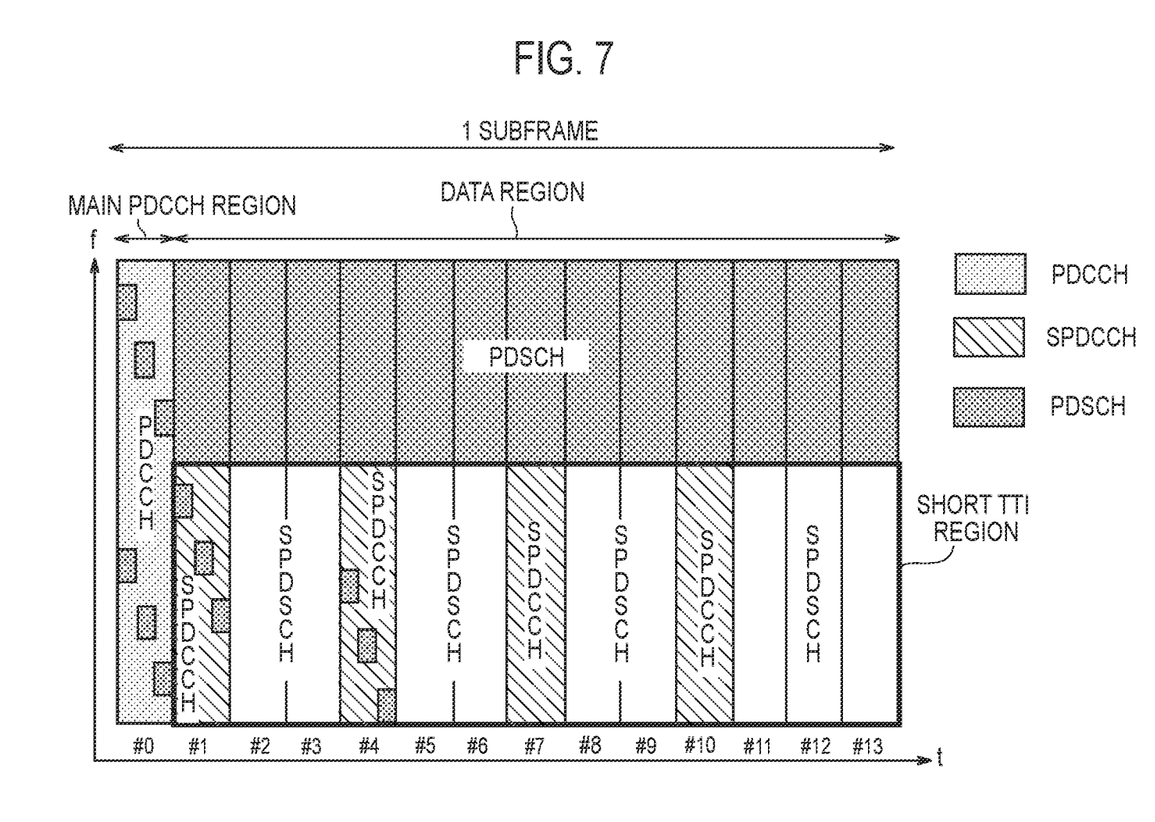
FIG. 7 is a diagram illustrating an example of an operation according to a first embodiment.

FIG. 7 is a diagram illustrating an example of an operation according to the first embodiment. Here, a difference from FIG. 6 will be mainly described.

As illustrated in FIG. 7, a short TTI having a time length shorter than the subframe is applied to the short TTI region. In the example of FIG. 7, the short TTI has a time length of three to four OFDM symbols. The short TTI region includes a plurality of SPDCCH regions and a plurality of SPDSCH regions. Each of the SPDCCH regions has a time length of one OFDM symbol. Each of the SPDCCH regions has a time length of two to three OFDM symbols. In the example of the short TTI region in FIG. 7, each of OFDM symbols #1, #4, #7, and #10 is an SPDCCH region and each of OFDM symbols #2 to #3, #5 to #6, #8 to #9, and #11 to #13 is an SPDSCH region.

In the first embodiment, the eNB 200 further arranges downlink data (PDSCH) in the main PDCCH region of OFDM symbol #0. The controller 230 arranges the downlink data in an available region in which control information is not arranged, in the main PDCCH region. The PDSCH to be included into the PDCCH region is constituted in CCE units.

Firstly, a case is assumed where the eNB 200 uses the main PDCCH region to transmit control information and downlink data to the UE 100#1. First, if control information of each of a plurality of UEs 100 including the UE 100#1 is arranged in the main PDCCH region, the eNB 200 determines whether or not an available region (an available CCE) in which the control information is not arranged, is present. Here, description proceeds under the assumption that it is determined that the available region is present. Next, the eNB 200 arranges the downlink data of the UE 100#1 in the available region. Further, the eNB 200 includes the CCE index group of the available region in which the downlink data is arranged, into the control information of the UE 100#1 and arranges the control information in the main PDCCH region. It is noted that a CRC (Cyclic Redundancy Check) masked by a C-RNTI (Cell-Radio Network Temporary Identifier) of the UE 100#1 is added to the control information of the UE 100#1. Subsequently, the eNB 200 uses the main PDCCH region to transmit the control information and the downlink data to UE 100#1. The UE 100#1 temporarily stores the received control information and downlink data in the main PDCCH region, and performs blind decoding of the control information in a search space of the UE 100#1. Specifically, the UE 100#1 uses the C-RNTI of the UE 100#1 to perform demasking of the CRC and, if no CRC error is detected, acquires the control information to which the CRC is added, as the control information of the UE 100#1. Next, the UE 100#1 acquires, from the control information, the CCE index group in which the downlink data is arranged, and acquires, as the downlink data of the UE 100#1, the downlink data arranged in the CCE corresponding to the acquired CCE index group. The UE 100#1 discards, among the temporarily stored control information and downlink data, all pieces of information other than the control information of the UE 100#1 and the downlink data of the UE 100#1.

Secondly, a case is assumed where the eNB 200 uses the SPDCCH region of the OFDM symbol #1 to transmit control information and downlink data to the UE 100#2. First, if control information of each of a plurality of UEs 100 including the UE 100#2 is arranged in the SPDCCH region, the eNB 200 determines whether or not an available region (an available CCE) in which the control information is not arranged, is present. Here, description proceeds under the assumption that it is determined that the available region is present. Next, the eNB 200 arranges the downlink data of the UE 100#2 in the available region. Further, the eNB 200 includes, into the control information of the UE 100#2, the CCE index group of the available region in which the downlink data is arranged and arranges the control information in the SPDCCH region. It is noted that a CRC masked by a C-RNTI of the UE 100#2 is added to the control information of the UE 100#2. Subsequently, the eNB 200 uses the SPDCCH region to transmit the control information and the downlink data to UE 100#2. The UE 100#2 temporarily stores the received control information and downlink data from in the SPDCCH region, and performs blind decoding of the control information in a search space of the UE 100#2. Specifically, the UE 100#2 uses the C-RNTI of the UE 100#2 to perform demasking of the CRC and, if no CRC error is detected, acquires the control information to which the CRC is added, as the control information of the UE 100#2. Next, the UE 100#2 acquires, from the control information, the CCE index group in which the downlink data is arranged, and acquires, as the downlink data of the UE 100#2, the downlink data arranged in the CCE corresponding to the acquired CCE index group. The UE 100#2 discards, among the temporarily stored control information and downlink data, all pieces of information other than the control information of the UE 100#2 and the downlink data of the UE 100#2. It is noted that, if allocation information indicating the
PDSCH resource to be allocated of the SPDCCH region of subframe #2 and/or #3 is included in the control information of the UE 100#2, the UE 100#2 identifies the PDSCH resource to be allocated based on the allocation information, and receives and decodes the downlink data arranged in the PDSCH resource to be allocated.

Second Embodiment

A second embodiment will be described while focusing on a difference from the first embodiment below.

(1) Base Station According to Second Embodiment

The eNB 200 (base station) according to the second embodiment includes the controller 230 configured to perform a downlink transmission process using a subframe. The subframe includes a main PDCCH region located at a head portion of the subframe, and a data region other than the main PDCCH region. The data region includes a short TTI region to which a short TTI having a time length shorter than the subframe, is applied. The short TTI region includes an SPDCCH region. The controller 230 arranges information indicating the SPDCCH region (hereinafter, referred to as "SPDCCH allocation information") in the main PDCCH region. It should be noted that, in existing LTE systems, the allocation information of the PDSCH is arranged in the main PDCCH region, whereas the allocation information of the PDCCH (SPDCCH) is not arranged in the main PDCCH region. The controller 230 may further arrange information indicating the SPDSCH region (hereinafter, referred to as "SPDSCH allocation information") in the main PDCCH region. Each of the SPDCCH allocation information and the SPDSCH allocation information include at least one of resource block (RB) information, a transmission OFDM symbol number, a period, a data length, and MCS.

In the second embodiment, the data region further includes a legacy TTI region. The controller 230 may further arrange information indicating the legacy TTI region in the main PDCCH region. For example, the information indicating the legacy TTI region includes a frequency range (resource block information) of the legacy TTI region.

(2) Radio Terminal According to Second Embodiment

The UE 100 (radio terminal) according to the second embodiment includes the controller 130 configured to perform a downlink reception process by using a subframe. The subframe includes a main PDCCH region located at a head portion of the subframe, and a data region other than the main PDCCH region. The data region includes a short TTI region to which a short TTI having a time length shorter than the subframe, is applied. The short TTI region includes an SPDCCH region. If the SPDCCH allocation information is arranged in the main PDCCH region, the controller 130 identifies, based on the SPDCCH allocation information, an SPDCCH region to be monitored, and monitors the identified SPDCCH region.

Thus, the UE 100 grasps, based on the SPDCCH allocation information, the SPDCCH region to be monitored by the UE 100. The UE 100 only needs to monitor the grasped SPDCCH region, and thus, it is possible to reduce the load and power consumption of the UE 100.

Further, if the SPDSCH allocation information is further arranged in the main PDCCH region, the controller 130 may identify an SPDSCH region, based on the SPDSCH allocation information. Further, if the information indicating the legacy TTI region is further arranged in the main PDCCH region, the controller 130 may identify the legacy TTI area, based on the information.

(3) Example of Operation According to Second Embodiment

Figure 8:
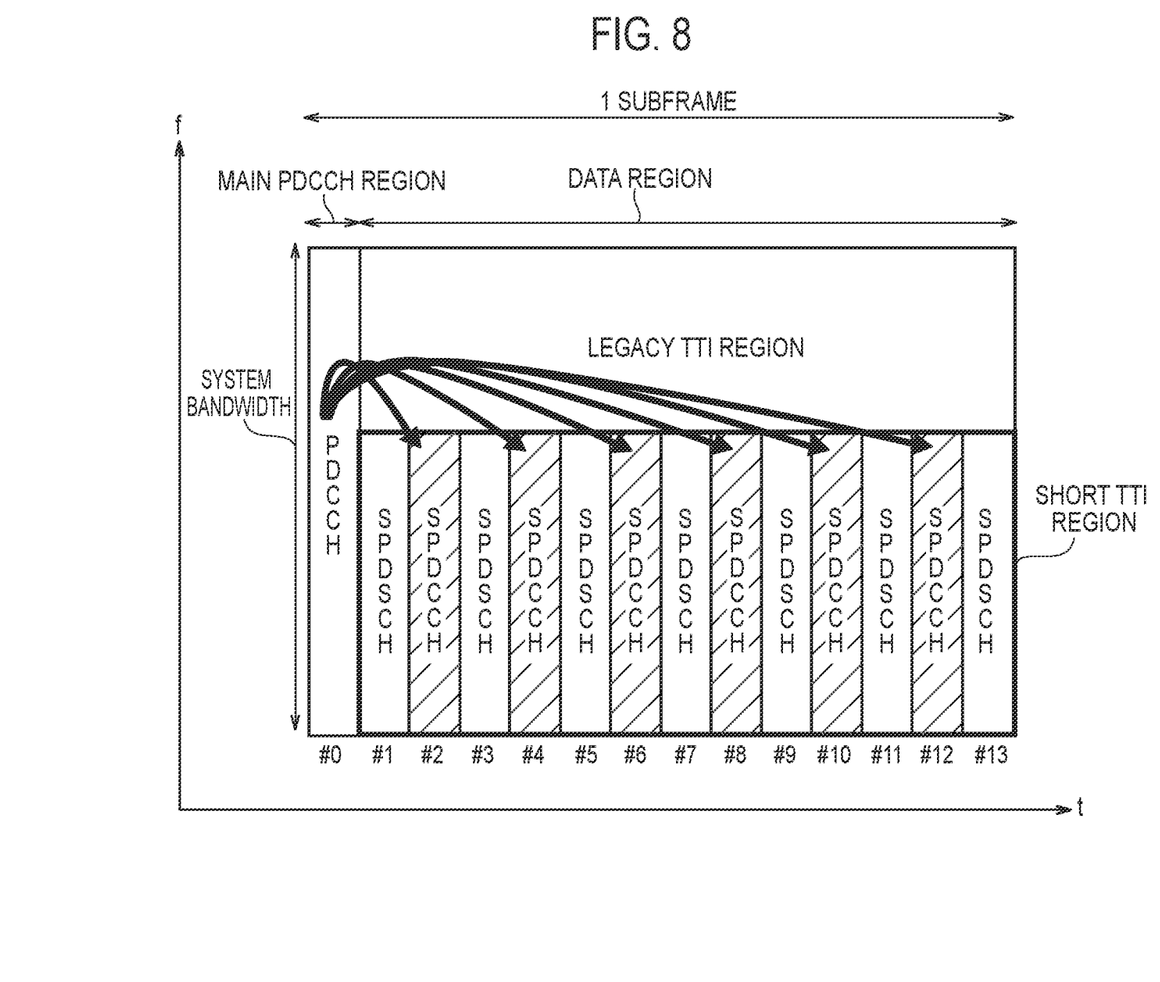
FIG. 8 is a diagram illustrating an example of an operation according to a second embodiment.

FIG. 8 is a diagram illustrating an example of an operation according to the second embodiment. Here, a difference from FIG. 6 will be mainly described.

In the second embodiment, the eNB 200 arranges SPDCCH allocation information of each of OFDM symbols #2, #4, #6, #8, #10, and #12 to the main PDCCH region of OFDM symbol #0. The SPDCCH allocation information includes at least one of resource block (RB) information, a transmission OFDM symbol number, a period, a data length, and MCS. The eNB 200 may arrange the SPDCCH allocation information in a common search space of the main PDCCH region, and may arrange the SPDCCH allocation information in a UE-specific search space. For example, if arranging the SPDCCH allocation information in a UE-specific search space of one UE, the eNB 200 may arrange SPDCCH allocation information limited to only the SPDCCH region to be allocated to the one UE, in the UE-specific search space of the one UE. In this case, the one UE may only be notified of SPDCCH regions of some of the OFDM symbols #2, #4, #6, #8, #10, and #12. Alternatively, the eNB 200 may designate SPDSCH allocation information limited to the SPDSCH region to be allocated to one UE, directly to the one UE.

Based on the SPDCCH allocation information, the UE 100 identifies an SPDCCH region to be monitored, and monitors the identified SPDCCH region. The UE 100 may not monitor a duration other than the SPDCCH region to be monitored. For example, if the SPDCCH allocation information received in the main PDCCH region of one subframe indicates that the SPDCCH region to be monitored is not present in the one subframe, the controller 130 does not perform monitoring in a duration of a data region of the one subframe.

Third Embodiment

A third embodiment will be described while focusing on differences from the first and second embodiments, below.

(1) Base Station According to Third Embodiment

The eNB 200 (base station) according to the third embodiment includes the controller 230 configured to perform a downlink transmission process using a subframe. The subframe includes a main PDCCH region located at a head portion of the subframe, and a data region other than the main PDCCH region. The data region includes a short TTI region to which a short TTI having a time length shorter than the subframe, is applied. The short TTI region includes a plurality of SPDSCH regions. The controller 230 performs scheduling of the plurality of SPDSCHs regions collectively in one PDCCH transmission. Hereinafter, such a collective scheduling of the plurality of SPDSCHs (a plurality of short TTIs) is referred to as eSPS (enhanced Semi Persistent Scheduling). It should be noted that, in existing LTE systems, the SPS is used in scheduling over a plurality of subframes, whereas the SPS is not used in scheduling of a plurality of SPDSCH regions within one subframe. The controller 230 arranges eSPS allocation information (SPDSCH allocation information) indicating a scheduling result, in the main PDCCH region or the SPDCCH region. Therefore, it is possible to reduce the SPDCCH regions, even if the short TTI region is arranged and thus, it is possible to increase the radio resources (that is, the PDSCH resources) usable for transmission of the downlink data.

In the third embodiment, the controller 230 arranges the eSPS allocation information at a predetermined period, or when changing the scheduling. When changing the scheduling, the controller 230 may only arrange difference information about a changed scheduling content, as the eSPS allocation information. Thus, it is possible to further reduce the SPDCCH regions. The changed scheduling content includes, for example, at least one of resource block (RB) information, a transmission OFDM symbol number, a period, a data length, and MCS.

(2) Radio Terminal According to Third Embodiment

The UE 100 (radio terminal) according to the third embodiment includes the controller 130 configured to perform a downlink reception process by using a subframe. The subframe includes a main PDCCH region located at a head portion of the subframe, and a data region other than the main PDCCH region. The data region includes a short TTI region to which a short TTI having a time length shorter than the subframe, is applied. The short TTI region includes a plurality of SPDSCH regions and at least one SPDCCH region. The controller 130 identifies a scheduling of a plurality of SPDSCH regions, based on eSPS allocation information (SPDSCH allocation information) arranged in the main PDCCH region or the SPDCCH region.

(3) Example of Operation According to Third Embodiment

Figure 9:
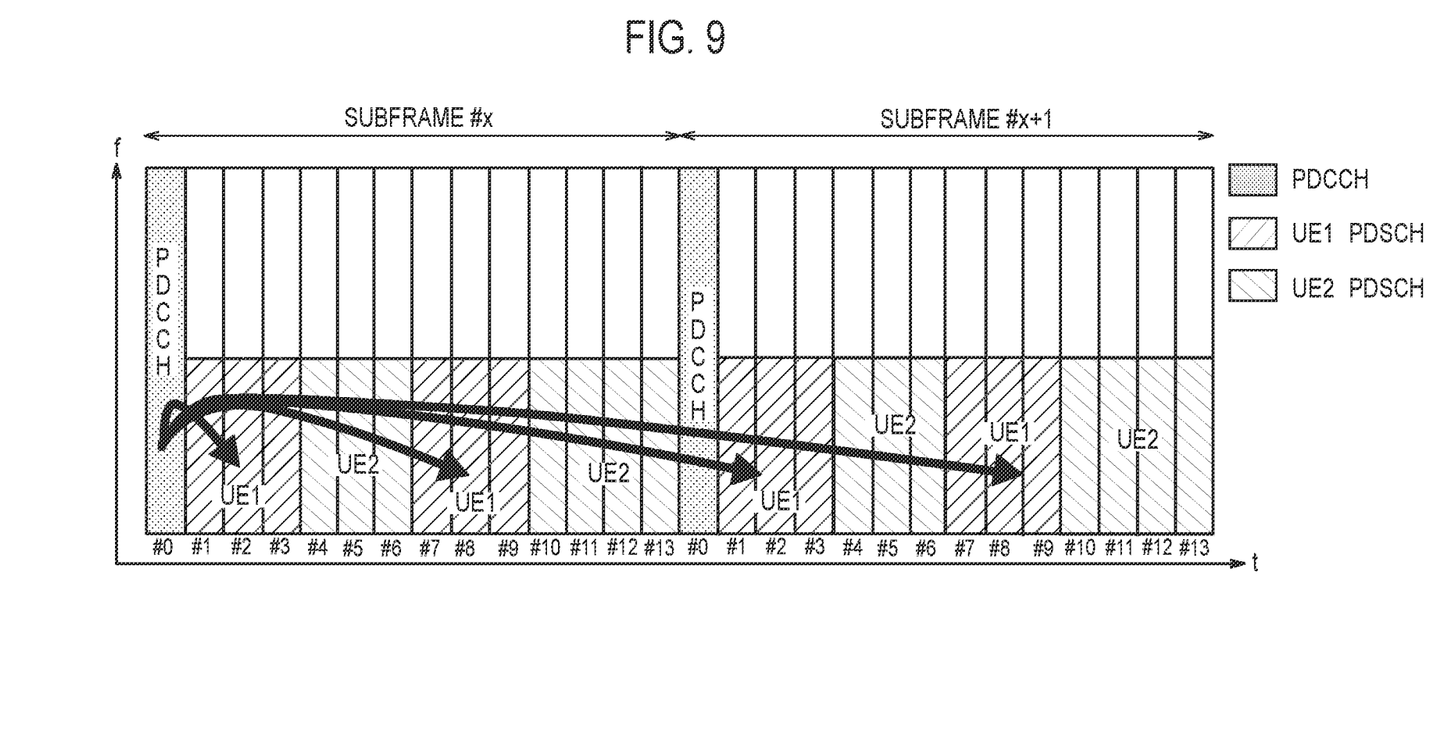
FIG. 9 is a diagram illustrating a first operation example according to a third embodiment.

FIG. 9 is a diagram illustrating a first operation example according to the third embodiment. Here, a difference from FIG. 6 will be mainly described. In FIG. 9, one UE 100 communicating with the eNB 200 is denoted as a UE 1 and another UE 100 communicating with the eNB 200 is denoted as a UE 2.

As illustrated in FIG. 9, the eNB 200 arranges, in a main PDCCH region of OFDM symbol #0 of subframe #x, SPDSCH allocation information indicating a SPDSCH resource to be allocated of the UE 1 and SPDSCH allocation information indicating a SPDSCH resource to be allocated of the UE 2. The SPDSCH allocation information includes at least one of resource block (RB) information, a transmission OFDM symbol number, a period, a data length, and MCS. A CRC masked using an SPS C-RNTI may be added to the SPDSCH allocation information.

In the example of FIG. 9, the eNB 200 allocates, to the UE 1, the SPDSCH region of OFDM symbols #1 to #3 and the SPDSCH region of OFDM symbols #7 to #9. Further, the eNB 200 allocates, to the UE 2, the SPDSCH region of OFDM symbols #4 to #6 and the SPDSCH region of OFDM symbols #10 to #13.

Based on the SPDSCH allocation information of the UE 1, arranged in the main PDCCH region, the UE 1 identifies the SPDSCH region of the OFDM symbols #1 to #3 and the SPDSCH region of the OFDM symbols #7 to #9, and receives and decodes downlink data of the UE 1, arranged in the SPDSCH regions. Further, based on the SPDSCH allocation information of the UE 2, arranged in the main PDCCH region, the UE 2 identifies the SPDSCH region of the OFDM symbols #4 to #6 and the SPDSCH region of the OFDM symbols #10 to #13, and receives and decodes downlink data of the UE 2, arranged in the SPDSCH regions.

Figure 10:
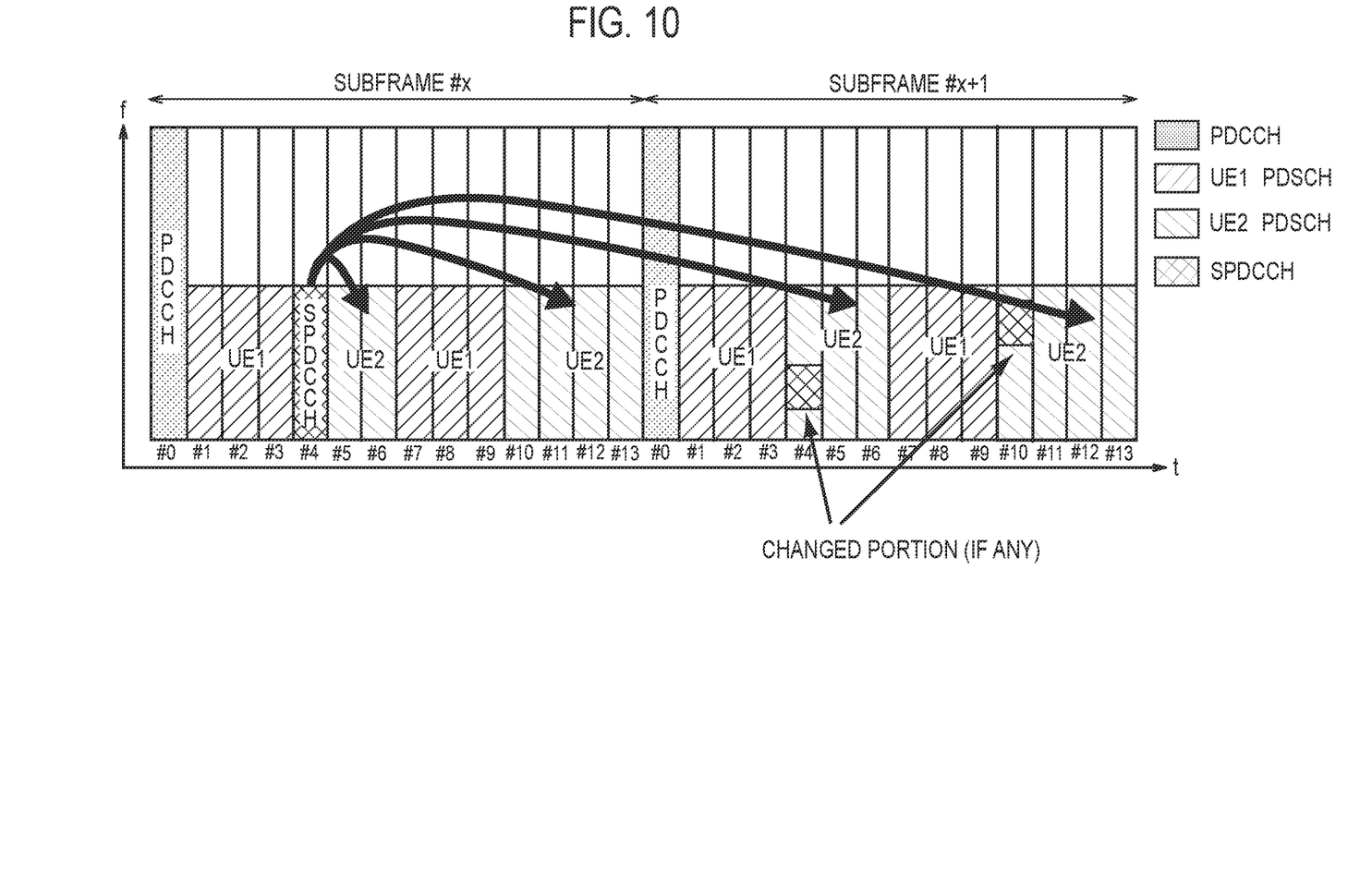
FIG. 10 is a diagram illustrating a second operation example according to the third embodiment.

FIG. 10 is a diagram illustrating a second operation example according to the third embodiment. Here, a difference from the above-described operation example 1 will be described.

As illustrated in FIG. 10, the eNB 200 arranges, in the SPDCCH region of OFDM symbol #4 of subframe #x, SPDSCH allocation information indicating an SPDSCH resource to be allocated of the UE 2.

The SPDSCH allocation information includes at least one of resource block (RB) information, a transmission OFDM symbol number, a period, a data length, and MCS.

In the example of FIG. 10, the eNB 200 allocates, in the subframe #x, the SPDSCH region of OFDM symbols #5 to #6 and the SPDSCH region of OFDM symbols #10 to #13, to the UE 2. Further, the eNB 200 allocates, for subframe #x+1, the SPDSCH region of OFDM symbols #4 to #6 and the SPDSCH region of the OFDM symbols #10 to #13, to the UE 2.

If changing, in the subframe #x+1, the scheduling content notified to the UE 2 in the subframe #x, the eNB 200 arranges difference information about a changed scheduling content, in the SPDCCH region.

In the example of FIG. 10, a part of resource elements of the OFDM symbol #4 and a part of resource elements of the OFDM symbol #10 of the subframe #x+1 are set as the SPDCCH region. The UE 2 grasps the changed scheduling content, based on the difference information arranged in the SPDCCH region.

Other Embodiments

The above-described first to third embodiments may be performed individually and may also be performed by combining two or more of the embodiments. If two or more of the embodiments are combined and performed, at least a part of the configuration of one embodiment may be added to or replace by a configuration of another embodiment.

In each embodiment described above, the LTE system is exemplified as the mobile communication system. However, the embodiment is not limited to the LTE system. The embodiment may be applied to systems other than the LTE system. For example, the embodiment may be applied to the fifth generation communication system (5G system).

INDUSTRIAL APPLICABILITY

The present invention is useful in the field of communication.

The invention claimed is:

1. A base station comprising
a controller configured to perform a downlink transmission process using a subframe, wherein
the subframe comprises a PDCCH (Physical Downlink Control Channel) region in which control information is arranged,
the PDCCH region comprises a main PDCCH region located at a head portion of the sub frame,
the subframe further comprises a data region other than the main PDCCH region,
the data region comprises a short Transmission Time Interval (TTI) region to which a short TTI having a shorter time length than the subframe is applied,
the PDCCH region further comprises a sub-PDCCH region arranged in the short TTI region, and
the controller is further configured to arrange downlink data in the sub-PDCCH region.

2. The base station according to claim 1, wherein
the controller is further configured to arrange the downlink data in an available region in which the control information is not arranged, in the sub-PDCCH region.

3. The base station according to claim 1, wherein
the controller is configured to include, into the control information, allocation information indicating a PDCCH resource in which the downlink data is arranged, and
the PDCCH resource is constituted in CCE (Control Channel Element) units.

4. A user equipment comprising
a controller configured to perform a downlink reception process using a subframe, wherein
the subframe comprises a PDCCH (Physical Downlink Control Channel) region in which control information is arranged,
the PDCCH region comprises a main PDCCH region located at a head portion of the sub frame,
the subframe further comprises a data region other than the main PDCCH region,
the data region comprises a short Transmission Time Interval (TTI) region to which a short TTI having a shorter time length than the subframe is applied,
the PDCCH region further comprises a sub-PDCCH region arranged in the short TTI region,
the control information comprises, if downlink data is further arranged in the sub-PDCCH region, allocation information indicating a PDCCH resource in which downlink data is arranged, and
the controller is configured to identify the PDCCH resource based on the allocation information.

5. A method for a base station, comprising:
performing by the base station, a downlink transmission process using a subframe, wherein
the subframe comprises a PDCCH (Physical Downlink Control Channel) region in which control information is arranged,
the PDCCH region comprises a main PDCCH region located at a head portion of the sub frame,
the subframe further comprises a data region other than the main PDCCH region,
the data region comprises a short Transmission Time Interval (TTI) region to which a short TTI having a shorter time length than the subframe is applied,
the PDCCH region further comprises a sub-PDCCH region arranged in the short TTI region, and
the method further comprises:
arranging downlink data in the sub-PDCCH region by the base station.

* * * * *